(12) United States Patent
Li et al.

(10) Patent No.: US 6,529,508 B1
(45) Date of Patent: Mar. 4, 2003

(54) METHODS AND APPARATUS FOR PACKET CLASSIFICATION WITH MULTIPLE ANSWER SETS

(75) Inventors: Renwei Li, Vancouver (CA); Thomas W. Ng, Richmond (CA); Paul Terry, Coquitlam (CA); Henry Lee, Coquitlam (CA)

(73) Assignee: Redback Networks Inc., San Jose, CA (US)

( * ) Notice: Subject to any disclaimer, the term of this patent is extended or adjusted under 35 U.S.C. 154(b) by 0 days.

(21) Appl. No.: 09/316,466

(22) Filed: May 21, 1999

Related U.S. Application Data

(60) Provisional application No. 60/118,156, filed on Feb. 1, 1999.

(51) Int. Cl.$^7$ ................................................ H04L 12/56
(52) U.S. Cl. ............. 370/392; 370/395.31; 370/395.21; 370/395.43
(58) Field of Search .......................... 370/392, 395.31, 370/395.21, 395.43

(56) References Cited

U.S. PATENT DOCUMENTS

| | | | | |
|---|---|---|---|---|
| 4,736,363 A | | 4/1988 | Aubin et al. | |
| 5,951,651 A | * | 9/1999 | Lakshman et al. | 370/351 |
| 6,034,958 A | * | 3/2000 | Wicklund | 370/395.32 |
| 6,075,791 A | | 6/2000 | Chiussi et al. | |
| 6,104,728 A | * | 8/2000 | Heinrich | 340/825.52 |
| 6,212,183 B1 | * | 4/2001 | Wilford | 370/383 |
| 6,289,013 B1 | * | 9/2001 | Lakshman et al. | 370/389 |
| 6,289,414 B1 | * | 9/2001 | Feldmeier et al. | 711/108 |
| 6,308,219 B1 | * | 10/2001 | Hughes | 370/392 |
| 6,389,506 B1 | * | 5/2002 | Ross et al. | 365/49 |

FOREIGN PATENT DOCUMENTS

| | | |
|---|---|---|
| EP | 0859492 A2 | 8/1998 |
| WO | WO 98/23080 A | 5/1998 |
| WO | WO 98/45976 | 10/1998 |
| WO | WO 00/08817 A | 2/2000 |
| WO | WO 00/11885 A | 3/2000 |
| WO | PCT/CA 00/00939 | 9/2001 |

OTHER PUBLICATIONS

Laksham, T. V. et al.: "High–Speed Policy–Based Packet Forwarding Using Efficient Multi–Dimensional Range Matching", Computer Communications Review, Association for Computing Machinery, New York, US, vol. 28, No. 4, Oct. 1998 (1998–10), pp. 203–214, XP0000914436, ISSN: 0146–4833, p. 208, right–hand column, line 35—209, left–hand column, line 26.

Lakshman and Stiliadis. High–speed policy–based packet forwarding using efficient multi–dimensional range matching ACM SIGCOMM Computer Communication Review, Oct. 1998, v. 28, Issue 4, pp 203–214.*

PCT/CA 00/00937, International Search Report, 4 pages, Aug. 27, 2001.

Sally Floyd and Van Jacobson, "Link–Sharing and Resource Management Models for Packet Networks," IEEE/ACM Transactions on Networking, vol. 3, No. 4, pp. 365–386, Aug. 1995.

* cited by examiner

*Primary Examiner*—Hassan Kizou
*Assistant Examiner*—D Levitan
(74) *Attorney, Agent, or Firm*—Blakely Sokoloff Taylor & Zafman LLP

(57) ABSTRACT

Providing different levels of quality of service for different data flows being transported over a data link requires a very fast way to classify individual packets. Providing meaningful classification generally requires classifying data packets in several dimensions. A classification method processes multiple parameter values for a packet in parallel to obtain answer sets indicating which rules are matched by each parameter value. Answer indexes identify logical blocks in each answer set which contain TRUE values. The method performs an AND operation on the answer indexes to identify those blocks in the answer sets which could contain bits corresponding to matched rules. An AND operation is performed on the identified blocks to identify the particular rule matched by the packet. The classification method allows extremely fast wire speed packet classification.

29 Claims, 12 Drawing Sheets

METHODS AND APPARATUS FOR PACKET CLASSIFICATION WITH MULTIPLE ANSWER SETS

CROSS REFERENCE TO RELATED APPLICATIONS

This application claims priority from U.S. provisional application No. 60/118,156 filed Feb. 1, 1999 which is entitled PACKET CLASSIFICATION METHODS AND APPARATUS, METHODS AND APPARATUS FOR DEPLOYING QUALITY OF SERVICE POLICIES ON A DATA COMMUNICATION NETWORK AND PACKET SCHEDULING METHODS AND APPARATUS.

FIELD OF THE INVENTION

This invention relates to the transmission of information, which may include voice data and video data, over computer networks. More specifically, this invention relates to methods and apparatus for classifying data packets. The classification methods and apparatus may be used in systems for providing a plurality of different levels of service each providing a different level of quality of service over wide area networks or other computer networks. The classification methods and apparatus have particular application in Internet Protocol ("IP") networks.

BACKGROUND OF THE INVENTION

Maintaining efficient flow of information over data communication networks is becoming increasingly important in today's economy. Telecommunications networks are evolving toward a connectionless model from a model whereby the networks provide end-to-end connections between specific points. In a network which establishes specific end-to-end connections to service the needs of individual applications the individual connections can be tailored to provide a desired bandwidth for communications between the end points of the connections. This is not possible in a connectionless network. The connectionless model is desirable because it saves the overhead implicit in setting up connections between pairs of endpoints and also provides opportunities for making more efficient use of the network infrastructure through statistical gains. Many networks today provide connectionless routing of data packets, such as Internet Protocol ("IP") data packets over a network which includes end-to-end connections for carrying data packets between certain parts of the network. The end-to-end connections may be provided by technologies such as Asynchronous Transfer Mode ("ATM"), Time Division Multiplexing ("TDM") and SONET/SDH.

A Wide Area Network ("WAN") is an example of a network in which the methods of the invention may be applied. WANs are used to provide interconnections capable of carrying many different types of data between geographically separated nodes. For example, the same WAN may be used to transmit video images, voice conversations, e-mail messages, data to and from database servers, and so on. Some of these services place different requirements on the WAN.

For example, transmitting a video signal for a video conference requires fairly large bandwidth, short delay (or "latency"), small delay jitter, and reasonably small data loss ratio. On the other hand, transmitting e-mail messages or application data can generally be done with lower bandwidth but can tolerate no data loss. Further, it is not usually critical that e-mail be delivered instantly. E-mail services can usually tolerate longer latencies and lower bandwidth than other services.

A typical WAN comprises a shared network which is connected by access links to two or more geographically separated customer premises. Each of the customer premises may include one or more devices connected to the network. More typically each customer premise has a number of computers connected to a local area network ("LAN"). The LAN is connected to the WAN access link at a service point. The service point is generally at a "demarcation" unit or "interface device" which collects data packets from the LAN which are destined for transmission over the WAN and sends those packets across the access link. The demarcation unit also receives data packets coming from the WAN across the access link and forwards those data packets to destinations on the LAN.

Currently an enterprise which wishes to link its operations by a WAN obtains an unallocated pool of bandwidth for use in carrying data over the WAN. While it is possible to vary the amount of bandwidth available in the pool (by purchasing more bandwidth on an as-needed basis), there is no control over how much of the available bandwidth is taken by each application.

As noted above, guaranteeing the Quality of Service ("QoS") needed by applications which require low latency is typically done by dedicating end-to-end connection-oriented links to each application. This tends to result in an inefficient allocation of bandwidth. Network resources which are committed to a specific link are not readily shared, even if there are times when the link is not using all of the resources which have been allocated to it. Thus committing resources to specific end-to-end links reduces or eliminates the ability to achieve statistical gains. Statistical gains arise from the fact that it is very unlikely that every application on a network will be generating a maximum amount of network traffic at the same time.

If applications are not provided with dedicated end-to-end connections but share bandwidth then each application can, in theory, share equally in the available bandwidth. In practice, however, the amount of bandwidth available to each application depends on things such as router configuration, the location(s) where data for each application enters the network, the speeds at which the application can generate the data that it wishes to transmit on the network and so on. The result is that bandwidth may be allocated in a manner that bears no relationship to the requirements of individual applications or to the relative importance of the applications. There are similar inequities in the latencies in the delivery of data packets over the network.

The term Quality of Service is used in various different ways by different authors. In general, QoS refers to a set of parameters which describe the required traffic characteristics of a data connection. In this specification the term QoS refers to a set of one or more of the following interrelated parameters which describe the way that a data connection treats data packets generated by an application:

Minimum Bandwidth—a minimum rate at which a data connection must be capable of forwarding data originating from the application. The data connection might be incapable of forwarding data at a rate faster than the minimum bandwidth but should always be capable of forwarding data at a rate equal to the rate specified by the minimum bandwidth;

Maximum Delay—a maximum time taken for data from an application to completely traverse the data connection. QoS requirements are met only if data packets traverse the data connection in a time equal to or shorter than the maximum delay; Maximum Loss—a maximum fraction of data packets from the application which may not be successfully transmitted across the data connection; and, Jitter—a measure of how much variation there is in the delay experienced by different packets from the application being transmitted across the data connection. In an ideal case where all packets take exactly the same amount of time to traverse the data connection the jitter is zero. Jitter may be defined, for example, as any one of various statistical measures of the width of a distribution function which expresses the probability that a packet will experience a particular delay in traversing the data connection. Different applications require different levels of QoS.

Recent developments in core switches for WANs have made it possible to construct WANs capable of quickly and efficiently transmitting vast amounts of data. There is a need for a way to provide network users with control over the QoS provided to different data services which may be provided over the same network.

Service providers who provide access to WANs wish to provide their customers with Service Level Agreements rather than raw bandwidth. This will permit the service providers to take advantage of statistical gain to more efficiently use the network infrastructure while maintaining levels of QoS that customers require. To do this, the service providers need a way to manage and track usage of these different services. There is a particular need for relatively inexpensive apparatus and methods for facilitating the provision of services which take advantage of different levels of QoS.

Applications connected to a network generate packets of data for transmission on the network. In providing different levels of service it is necessary to be able to sort or "classify" data packets from one or more applications into different classes which will be accorded different levels of service. The data packets can then be transmitted in a way which maintains the required QoS for each application. Data packets generated by one or more applications may belong to the same class.

Classifying data packets should be done extremely quickly, preferably at "wire speed" if the classification information is to be used to provide priority to data packets which require low latency. Currently available apparatus which can classify data packets at the wire speeds currently achievable is too expensive for widespread implementation. There is also a particular need for apparatus for classifying data packets which can be readily remotely configured and which is scalable.

SUMMARY OF THE INVENTION

The invention provides methods and apparatus for classifying data packets. The invention involves generating answer sets from a packet signature. An AND operation can be performed on the answer sets to identify a rule which is satisfied by the packet signature. The invention generates an index which identifies specific portions of the answer sets on which the AND operation should be performed. This can significantly reduce the time needed to classify a packet.

One embodiment of the invention provides a method for classifying data packets, the method comprises providing a plurality of classification rules. Each rule provides matching criteria for one or more parameters. The method obtains a signature comprising a plurality of parameter values for a data packet. For each of a plurality of the parameter values the method includes a step for setting a first group of flags, one of the first group of flags corresponding to each of the rules, each flag set to TRUE if the parameter value matches the matching criteria for the rule corresponding to the flag, each flag set to FALSE otherwise. Each first group of flags is divided into a plurality of blocks. For each of the first groups of flags, the method includes a step for setting a second group of flags, one of the second group of flags corresponding to each block in the corresponding first group of flags, each flag of the second group of flags set to TRUE if any flag in the corresponding block of the first group of flags is set to TRUE, each flag of the second group of flags set to FALSE otherwise. The method then performs a logical AND operation on those blocks in the first groups of flags for which the corresponding flags are set to TRUE in all of the second groups of flags. Preferably the blocks are equal in size. Most preferably the AND operations are performed in a processor having a register size and each of the blocks has a size equal to the register size of the processor.

The performance of the classification methods of the invention may be optimized by ordering the rules in a way such that true flags tend to be clustered into the same block in one of the answer sets. This reduces the number of AND operations needed to identify a rule which is matched by the signature of a packet. One way of achieving such an optimization is to group the rules so that flags corresponding to subsets of the rules which are neighbors are grouped together.

In some embodiments of the invention the method includes ordering the rules by selecting subsets of the rules so that each subset contains only neighboring rules, and, if any rules are present in both of any two of the subsets of neighboring rules removing those rules which are common to the two subsets from a larger one of the two subsets, and assigning each subset of rules to adjacent flags in one of the blocks.

The invention also provides packet handling apparatus for classifying data packets according to the invention. Further aspects and benefits of the invention are set out below.

BRIEF DESCRIPTION OF THE DRAWINGS

In the attached drawings which illustrate non-limiting embodiments of the invention.

DETAILED DESCRIPTION

This invention relates to classification of data packets. The invention may be applied in any situation where it is necessary to classify data packets. The invention may be applied, for example, in packet forwarders, routers, firewalls, statistics collectors or other packet handling devices on a network. The invention has particular application in situations where it is necessary or desirable to classify packets very quickly. The following description describes the application of the invention in devices which connect a LAN to a WAN but the invention is not limited to such devices.

Figure 1:
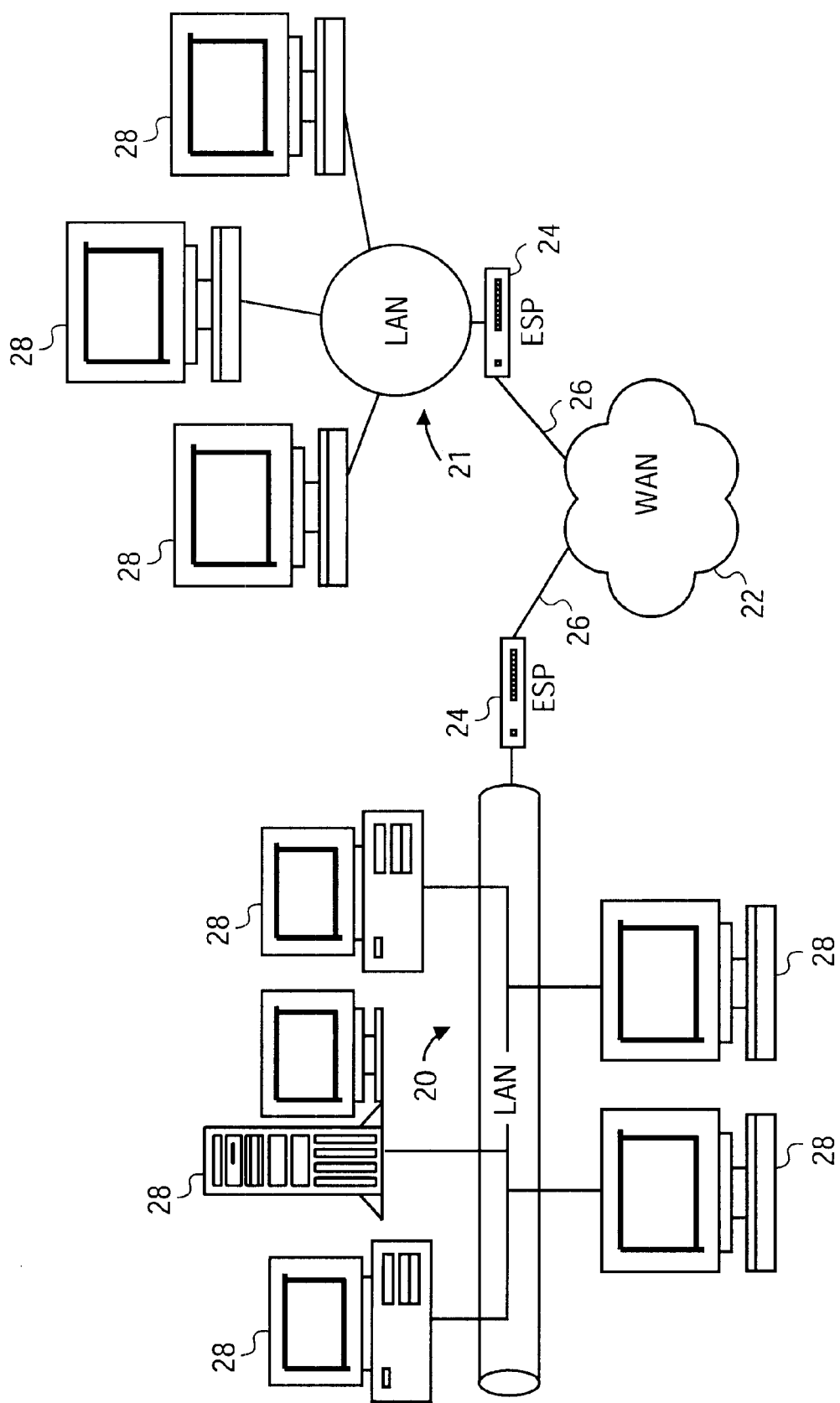
FIG. 1 is a schematic view of a wide area network according to the invention which comprises enterprise service point ("ESP") devices according to the invention.

FIG. 1 shows a generalized view of a pair of LANs 20, 21 connected by a WAN 22. Each LAN 20, 21 has an Enterprise Service Point unit ("ESP") 24 which connects LANs 20, 21 to WAN 22 via an access link 26. LAN 20 may, for example, be an Ethernet network, a token ring network or some other computer installation. Access link 26 may, for example, be an Asynchronous Transfer Mode ("ATM") link. Each LAN has a number of connected devices 28 which are capable of generating and/or receiving data for transmission on the LAN. Devices 28 typically include network connected computers.

Figure 2:
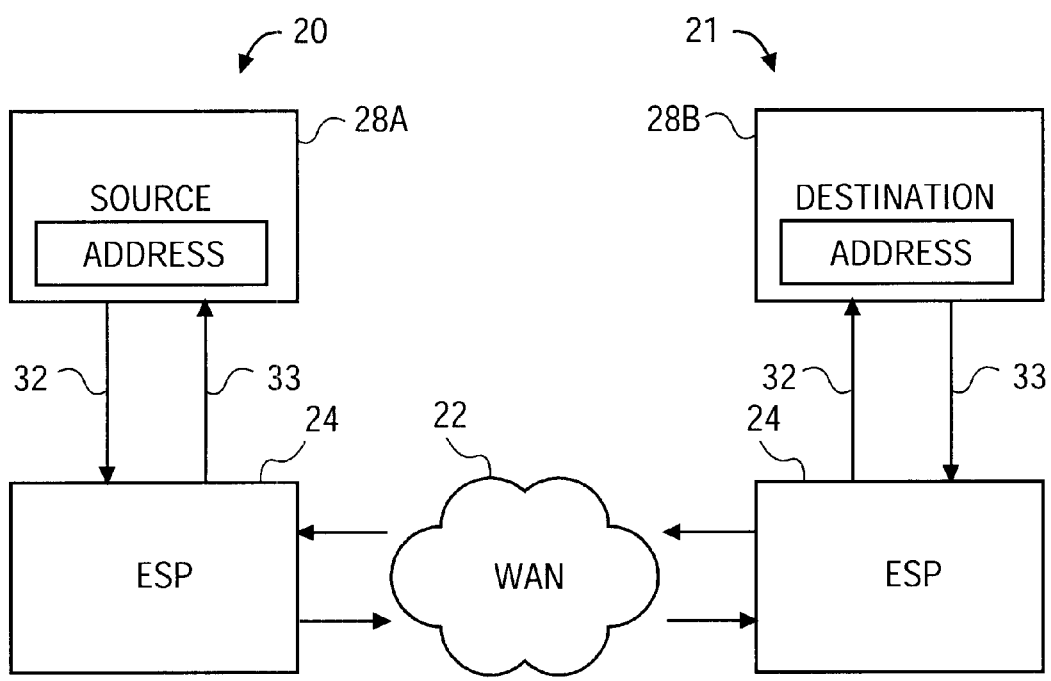
FIG. 2 is a schematic view illustrating two flows in a communications network according to the invention.

As required, various devices 28 on network 20 may establish data connections with devices 28 of network 21 over WAN 22 and vice versa. A single device may be running one or more applications which each may maintain unidirectional or bi-directional connections to applications on another device 28. Each connection may be called a session. Each session comprises one or more flows. Each flow is a stream of data from a particular source to a particular destination. For example, FIG. 2 illustrates a session between a computer 28A on network 20 and a computer 28B on network 21. The session comprises two flows 32 and 33. Flow 32 originates at computer 28A and goes to computer 28B through WAN 22. Flow 33 originates at computer 28B and goes to computer 28A over WAN 22. Most typically data in a great number of flows will be passing through each ESP 24 in any period. ESP 24 manages the outgoing flow of data through at least one port and typically through each of two or more ports.

Each flow consists of a series of data packets. In general the data packets may have different sizes. Each packet comprises a header portion which contains information about the packet and a payload or datagram. For example, the packets may be Internet protocol ("IP") packets.

Figure 3:
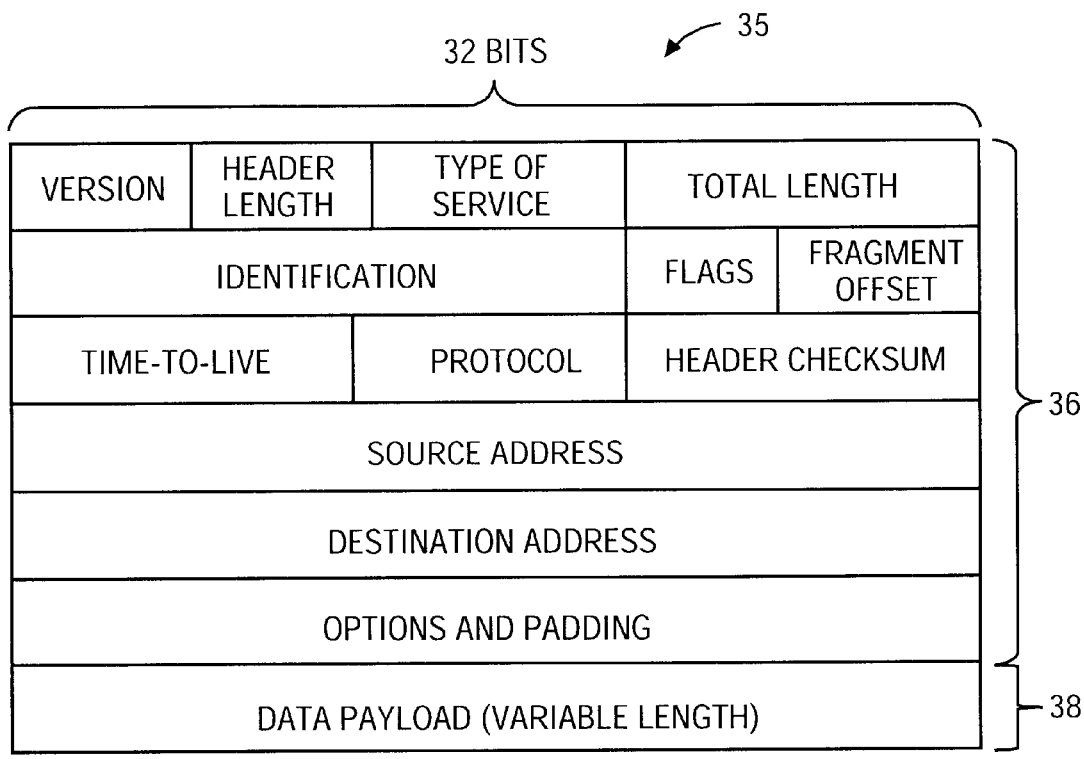
FIG. 3 is a diagram illustrating the various data fields in a prior art IP v4 data packet.

FIG. 3 illustrates the format of an IP packet 35 according to the currently implemented IP version 4. Packet 35 has a header 36 and a data payload 38. The header contains several fields. The "version" field contains an integer which identifies the version of IP being used. The current IP version is version 4. The "header length" field contains an integer which indicates the length of header 36 in 32 bit words. The "Type of Service" field contains a number which can be used to indicate a level of Quality of Service required by the packet. The "total length" field specifies the total length of packet 35. The "identification" field contains a number which identifies the data in payload 38. This field is used to assemble the fragments of a datagram which has been broken into two or more packets. The "flags" field contains 3-bits which are used to determine whether the packet can be fragmented. The "time-to-live" field contains a number which is decremented as the packet is forwarded. When this number reaches zero the packet may be discarded. The "protocol" field indicates which upper layer protocol applies to packet 35. The "header checksum" field contains a checksum which can be used to verify the integrity of header 36. The "source address" field contains the IP address of the sending node. The "destination address" field contains the IP address of the destination node. The "options" field may contain information related to packet 35.

Each ESP 24 receives streams of packets from its associated LAN and from WAN 22. These packets typically belong to at least several different flows. The combined bandwidth of the input ports of an ESP 24 is typically greater than the bandwidth of any single output port of ESP 24. Therefore, ESP 24 typically represents a queuing point where packets belonging to various flows may become backlogged while waiting to be transmitted through a port of ESP 24. Backlogs may occur at any output port of ESP 24. While this invention is preferably used to manage the scheduling of packets at all output ports of ESP 24, the invention could be used at any one or more output ports of ESP 24.

For example, if the output port which connects ESP 24 to WAN 22 is backlogged then ESP 24 must determine which packets to send over access link 26, in which order, to make the best use of the bandwidth available in access link 26 and to provide desired levels of QoS to individual flows. To do this, ESP 24 must be able to classify each packet, as it arrives, according to certain rules. ESP 24 can then identify those packets which are to be given priority access to link 26. After the packets are classified they can be scheduled for transmission.

Packets must be classified extremely quickly. For example, a delay of much more than 150 milliseconds is unacceptable for two-way voice conversations. If classifying and scheduling a packet takes 1 millisecond then at most 1000 packets can be forwarded per second (if the classification and scheduling is done sequentially). If each packet is 40 bytes long then the maximum throughput is only 320 Kbps. To support high speed links such as OC3, it should not take more than 2 microseconds to classify and schedule each packet. It preferably takes only about 1 microsecond to process each packet. This invention provides methods and apparatus for classifying packets received at an ESP 24 or other queuing point in a data connection.

Figure 4:
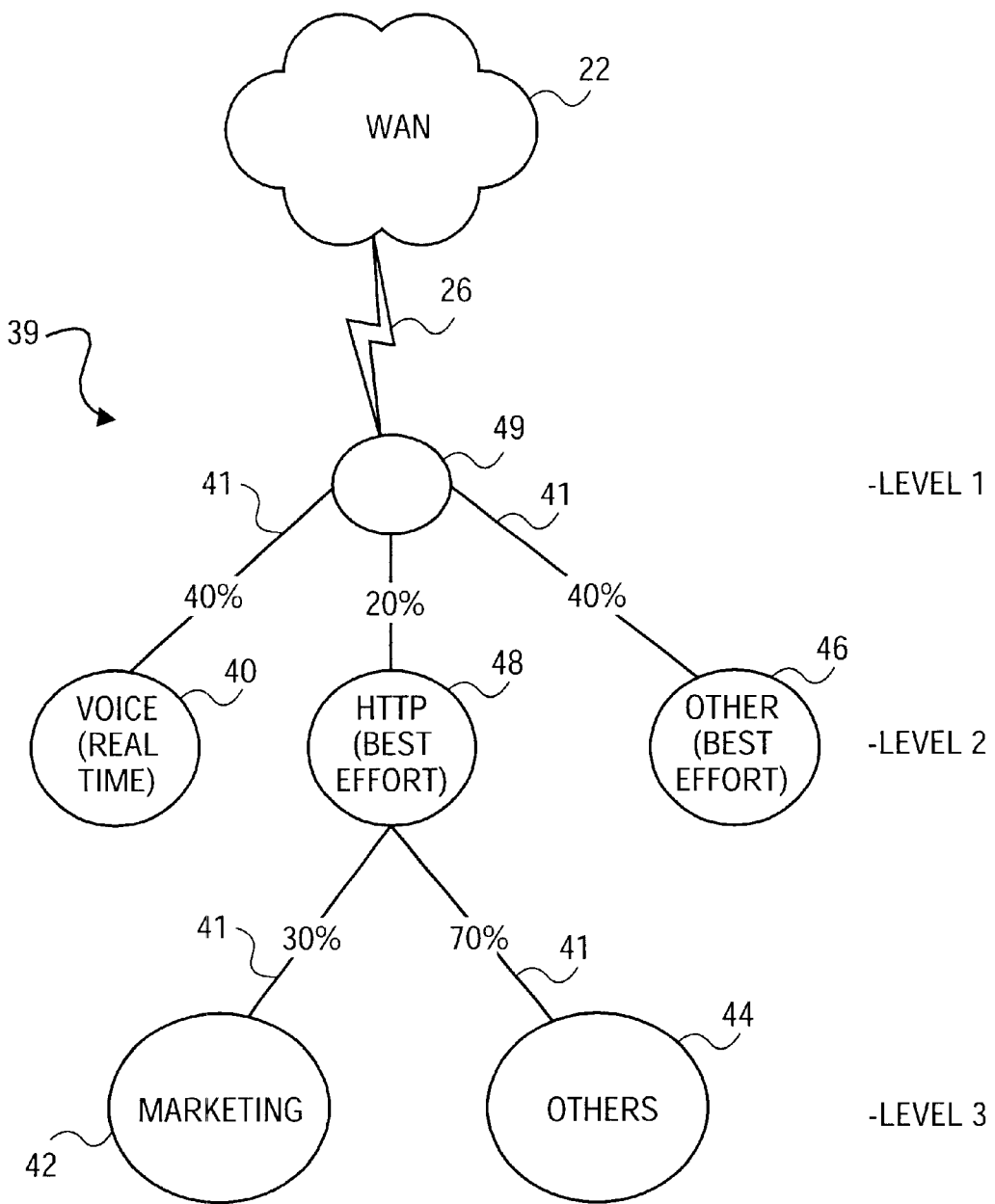
FIG. 4 is a schematic view showing an example of a policy which may be implemented with the methods and apparatus of the invention.

Incoming packets are sorted into classes according to a policy which includes a set of rules. For each class, the rules specify the attributes which a data packet must possess for the data packet to belong to the class. The policy preferably also establishes QoS levels for the different classes. FIG. 4 schematically illustrates one possible policy 39. Policy 39 is specified in the form of a "policy tree" or "classification tree" for each output port of ESP 24 (an ESP 24 may have several separate output ports). The tree has a number of leaf nodes 40, 42, 44, 46. Each leaf node corresponds to a class. Each class may be treated differently in order to provide guaranteed levels of QoS to selected applications. At any given time, ESP 24 may be holding zero, one, or more packets belonging to each class. The packets in a class may belong to zero, one, or more flows. Non-leaf nodes of policy tree 39 may also be called "classes" although the classes into which packets are initially classified correspond to leaf classes of policy tree 39.

In the example of FIG. 4, a class 40 contains voice traffic. Class 40 may be termed a "real time" class because it is important to deliver packets in class 40 quickly enough to allow a voice conversation. Packets in class 40 will be scheduled so that each flow in class 40 will be guaranteed a level of QoS sufficient for voice communication including sufficient bandwidth to support a real time voice session.

Class 40 is entitled to at least 40% of the bandwidth available. The number of simultaneous flows in class 40 may be limited to a maximum value so that each flow will be guaranteed sufficient bandwidth to support a real time voice conversation.

Classes 42 and 44 contain flows of Hyper Text Transfer Protocol ("HTTP") sessions. Class 42 contains HTTP flows which originate in MARKETING. MARKETING may be, for example, sources 28 associated with a company's marketing department. Other HTTP flows fall into class 44. As indicated at 48, in the policy of FIG. 4, classes 42 and 44 will share between themselves at least 20% of the bandwidth available. The other 40% of the bandwidth is allocated to class 46 which covers all other flows. Of the bandwidth shared by classes 42 and 44, at least 30% is allocated to class 42 and at least 70% is allocated to class 44. The actual bandwidth available at a node may be greater than the minimum bandwidth allocated by policy 39. For example, packets coming through node 42 may enjoy more than 30% of the bandwidth of node 48 which is shared between nodes 42 and 44 if there is no backlog of packets at node 44 (i.e. node 44 is not using all of the minimum bandwidth to which it is entitled). If, for example, at some time there are no packets for transmission which are associated with node 44 then all of the bandwidth shared by nodes 42 and 44 is available to packets associated with node 42.

As each new packet arrives at ESP 24 from LAN 20 the new packet is classified. Classification involves extracting information intrinsic to a packet such as the source address, destination address, protocol, and so on. Classification may also involve information external to the data packets such as the time of day, day of week, week of the year, special calendar date and the port at which the packet arrives at ESP 24. This information, which comprises a set of parameters for each packet, is used to classify the packet according to a set of rules.

In preferred embodiments of the invention ESP 24 reads some or all of the following information from each IP packet:

1. input port on which packet arrived at ESP 24;
2. source IP address (src);
3. destination IP address (dst);
4. source User Datagram Protocol (UDP) or Transmission Control Protocol (TCP) port number (sport);
5. destination UDP or TCP port number (dport);
6. layer 3 packet type (in a typical embodiment the layer 3 packet type maybe one of: IP, Address Resolution Protocol (ARP)/Reverse Address Resolution Protocol (RARP), Internet Packet Exchange (IPX)/Sequenced Packet Exchange (SPX), or Ethertalk) this parameter is not useful if only one protocol, such as only IP, is being used;
7. Type of Service ("TOS") value (tos);
8. layer 4 packet type (in a typical embodiment the layer 4 packet type may be one of: TCP or UDP);
9. TCP acknowledgement flag; and,
10. Acknowledge (ACK) bit.

Preferably ESP 24 also tracks the time the packet arrives at ESP 24 relative to some reference time (for example, the time may be expressed in milliseconds since epoch— midnight GMT on Jan. 1, 1970). These 11 parameters, a subset of these parameters, or a combination of these parameters with other parameters can be used to classify each new packet according to rules in a set of rules, which may be called a rule base. The parameters used for classification could even include fields inside a TCP/UDP packet header or information in the data being carried by the packet. The set of parameter values used to classify each packet may be termed a "signature" for that packet.

The inventors have found that for classifying IP packets the following 9 parameters are particularly useful: input port; source IP address; destination IP address; source TCP/UDP port number; destination TCP/UDP port number; type of service; layer 4 packet type; ack bit; and, time of arrival.

According to the preferred embodiment of the invention, each rule is of the form:

CLASS M: parameter 1=condition to be satisfied by parameter 1;

parameter 2=condition to be satisfied by parameter 2;

parameter 3=condition to be satisfied by parameter 3;

. . .

parameter N=condition to be satisfied by parameter N.

A packet belongs to class M if every parameter value in the packet's signature matches the corresponding condition specified by the rule. The condition may be that the parameter value be the same as a particular value, that the parameter value be one of a number of specified values or that the parameter value be within a range of values specified in the class definition rule.

Some classes may be "active" only during certain time periods. In this case packets may be classified in a class only if the class is active. The time of arrival of a packet can be compared to the class schedule to determine whether the class is active.

For some parameters some rules' conditions may be satisfied by any value for the parameter (i.e. the rule's condition for that parameter is a "wild card"). N is the dimensionality of the rule. For example, if there are 9 parameters used to classify packets the classification is a 9-dimensional classification. A problem in quickly classifying packets using multi-dimensional lookups is that it is very difficult to do a multi-dimensional lookup very fast, as is required, with apparatus that is reasonably affordable. In this preferred embodiment of the invention one or more rules corresponds to a class of policy tree 39.

In general, the signature for a packet may satisfy more than one rule. For example, one rule might provide that packets having a source address in a range which has been assigned to a particular department should be classified in one class. A second rule might specify that packets having a source address identifying a particular computer within the department should be classified in a different class. A packet originating at the particular computer would satisfy both rules simultaneously and would therefore fall within two different classes. However, the classification must be unique.

To avoid allowing packets to be classified in two different classes at the same time, specific rules can be given precedence over general rules. In one dimensional IP routing tables it is known to use longest prefix matching to specify which rules take precedence over other rules. When longest prefix matching is being used, a rule whose src or dst values are matched by a packet has precedence over other rules if its src or dst values are the longest matches for that packet. For example, if the following two one-dimensional rules exist:

class c: src=11010110 .*.*.*.
class d: src=11010110.01110110 .*.*.

(where an asterisk "*" indicates a wild card match such that any bit values will match the asterisk) then a packet having a source address of 11010110.01110110.10100000.01011101 should be classified in class d since class d matches the first 16 bits of the packet's source address while class c matches only the first 8 bits of the packet's source address.

Figure 5:
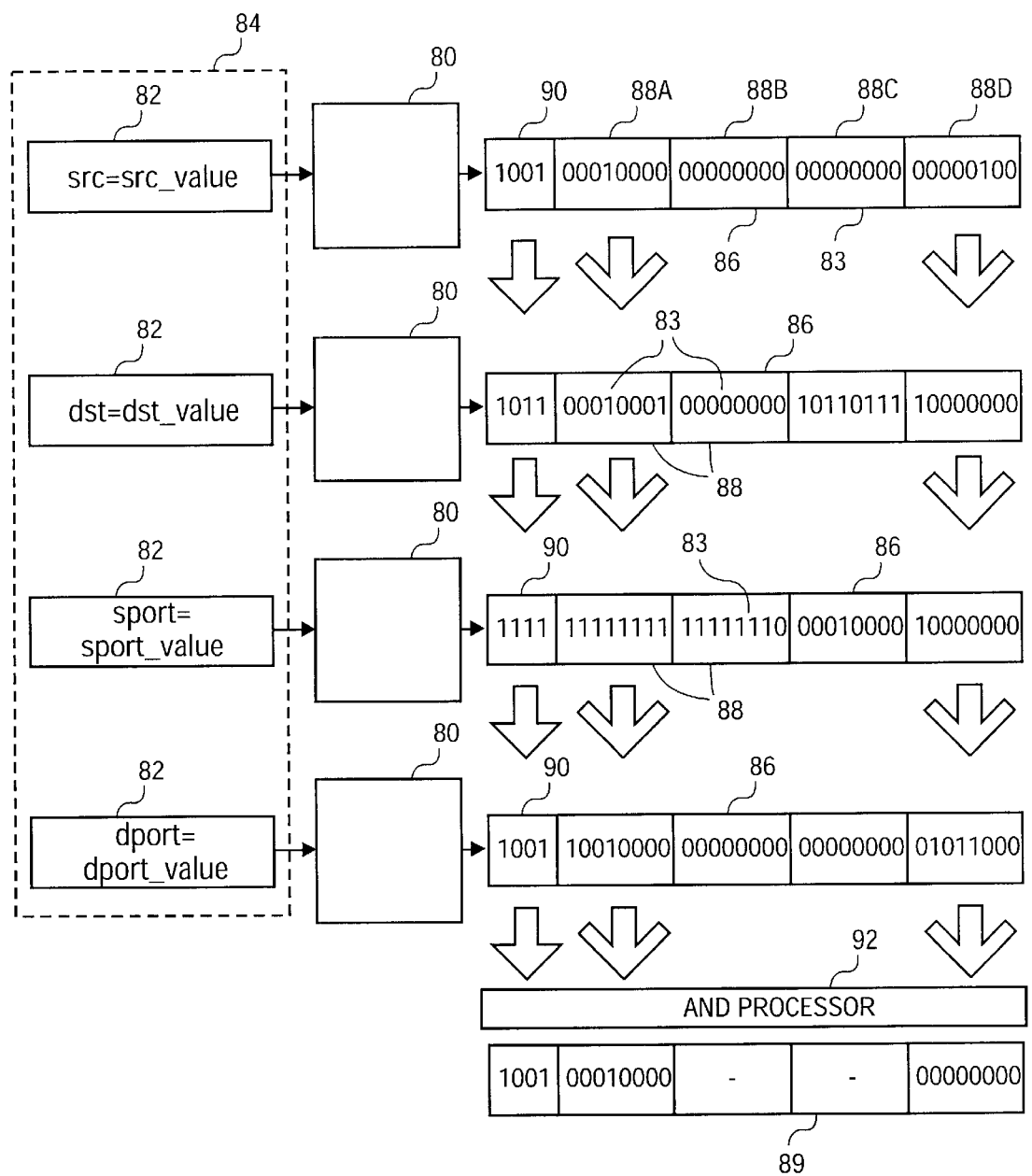
FIG. 5 is a schematic diagram which illustrates the method of the invention.

As shown in FIG. 5, the invention provides each parameter value 82 in the signature 84 of each packet which requires classification to a processor 80. FIG. 5 illustrates a simple case in which each packet's signature 84 contains values 82 for only 4 parameters (i.e. a case of 4-dimensional matching). Each processor 80 provides an output which includes a flag 83 for each rule. The collection 86 of flags 83 for each parameter 82 for all of the rules may be called an "answer set". Each flag 83 may comprise a memory location containing one or more bits which can be set to one of two different values.

Each answer set may be generated, for example, by looking up the value 82 of the parameter in question in a table in a memory accessible to processor 80. The table contains (or contains pointers to) previously computed answer sets for different values of the parameter. As is known to those skilled in the art, the lookup table and lookup algorithm may take any of various suitable forms depending upon how much memory is available. Processors 80 may comprise computer processors and accessible memory, field programmable gate arrays ("FPGAs")and accessible memory, Application Specific Integrated Circuits ("ASICs") or the like. Typically each flag 83 in an answer set will be represented by one binary bit and the flags 83 of each answer set 86 are arranged, at least logically, to form a bit vector which has one bit for each rule in the rule base. Whether or not the flags for each answer set are arranged as bit vectors or are arranged in some other way is a matter of design convenience. Answer sets 86 may be very large because the rule base may contain hundreds, thousands, or tens of thousands of rules.

If the parameter value 82 for the packet matches the condition which a rule specifies for that parameter then the corresponding flag in the answer set 86 for that parameter (e.g. the corresponding bit in the corresponding output vector) is set to "TRUE" (logical "1") otherwise the corresponding bit in answer set 86 is set to "FALSE" (logical "0"). In the FIG. 5 case there are only 32 rules and so each answer set 86 is represented as a bit vector only 32 bits long (the leading 4 bits which make up header 90 are not considered part of answer set 86). One answer set 86 (e.g. one output vector) is provided for each parameter in the packet's signature. For speed, the parameter values are preferably processed to obtain answer sets 86 in parallel by separate processors 80. After processors 80 have obtained answer sets 86 for each of the parameters in the packet's signature, the intersection of the answer sets 86 is computed.

In the currently preferred embodiment of the invention, the intersection of the different answer sets 86 is done by performing an AND operation on bit vector representations of answer sets 86 in a processor 92 (which could incorporate one or more of processors 80 or could be a separate device). AND processor 92 may be implemented in any suitable way. For example, AND processor 92 may comprise a programmed general purpose computer processor, a Field Programmable Gate Array ("FPGA") an Application Specific Integrated Circuit ("ASIC") or the like. The AND operation may be performed by several processing elements operating in parallel.

The result of computing the intersection of the answer sets 86 corresponding to each of the parameter values in the packet's signature is a result set. In the illustrated embodiment, the result set is shown as a bit vector 89 in which bits which correspond to rules which are satisfied by the packet's signature are set to TRUE. If the rule base is well formed, the result of the AND operation will be a result set (e.g. bit vector 89) with a single bit set to TRUE. Which one bit is set indicates the classification for the packet. If the rule base is constructed in a manner that permits two bits to be set simultaneously then the rules may be ordered so that a first rule r1 takes precedence over a second rule r2 if r1 comes before r2 in the ordering. For example, if the rules are arranged to correspond to bits in a bit vector 89 then rules corresponding to more significant bits in bit vector 89 may be given precedence over rules corresponding to less significant bits in bit vector 89.

A problem with some prior art methods is that the time required to classify packets increases as O(n) where n is the number of rules. This places significant limits on the number of rules and, in general, means that special hardware is needed to provide sufficient speed to classify packets to be transmitted on a reasonably high speed data link. It also means that such prior art methods are not readily scalable to accommodate larger values of n. Special hardware is not flexible or scalable. For example, in a case where there are 64 k rules and the processor 92 which performs the AND operation on answer sets 86 has the capacity to AND only 32 bits at a time, then 2,048 AND operations would be needed to AND together two output vectors representing two answer sets 86.

This invention takes advantage of the fact that in almost all practical cases at least some of the answer sets 86 will be sparse for any individual packet in the sense that only a few bits of the answer set 86 will be set to TRUE. In the method of the invention, each answer set is considered to be made up of a number of answer subsets. For example, in the illustrated embodiment, each answer set 86 is represented as a bit vector which is considered to be made up of a number of logical blocks 88. Processors 80 create (or look up) a second set of flags, which may be called an answer index, associated with each answer set 86. The answer index may be concatenated as a header 90 to each answer set bit vector. One flag in the answer index corresponds to each answer subset (e.g. to each block 88 in an answer set 86). The flag is set to TRUE if any bit in the corresponding block 88 is set to TRUE and is set to FALSE otherwise. The state of each flag in the answer index may be expressed as the result of a logical OR operation performed on all of the flags in a corresponding block 88 of the answer set 86 to which the answer index belongs.

In the example of FIG. 5, each block 88 has a length of 8 bits and each answer set 86 comprises 4 blocks 88A, 88B, 88C, and 88D. Header 90 comprises four bits, one bit corresponding to each block 88. In a commercial embodiment of the invention blocks 88 would typically have longer lengths equal to the number of bits that processor 92 can AND together in one operation (e.g. equal to a register size or word length of processor 92). The addition of header 90 makes it dramatically less time consuming to AND together large answer sets 86 without special hardware.

Figure 6:
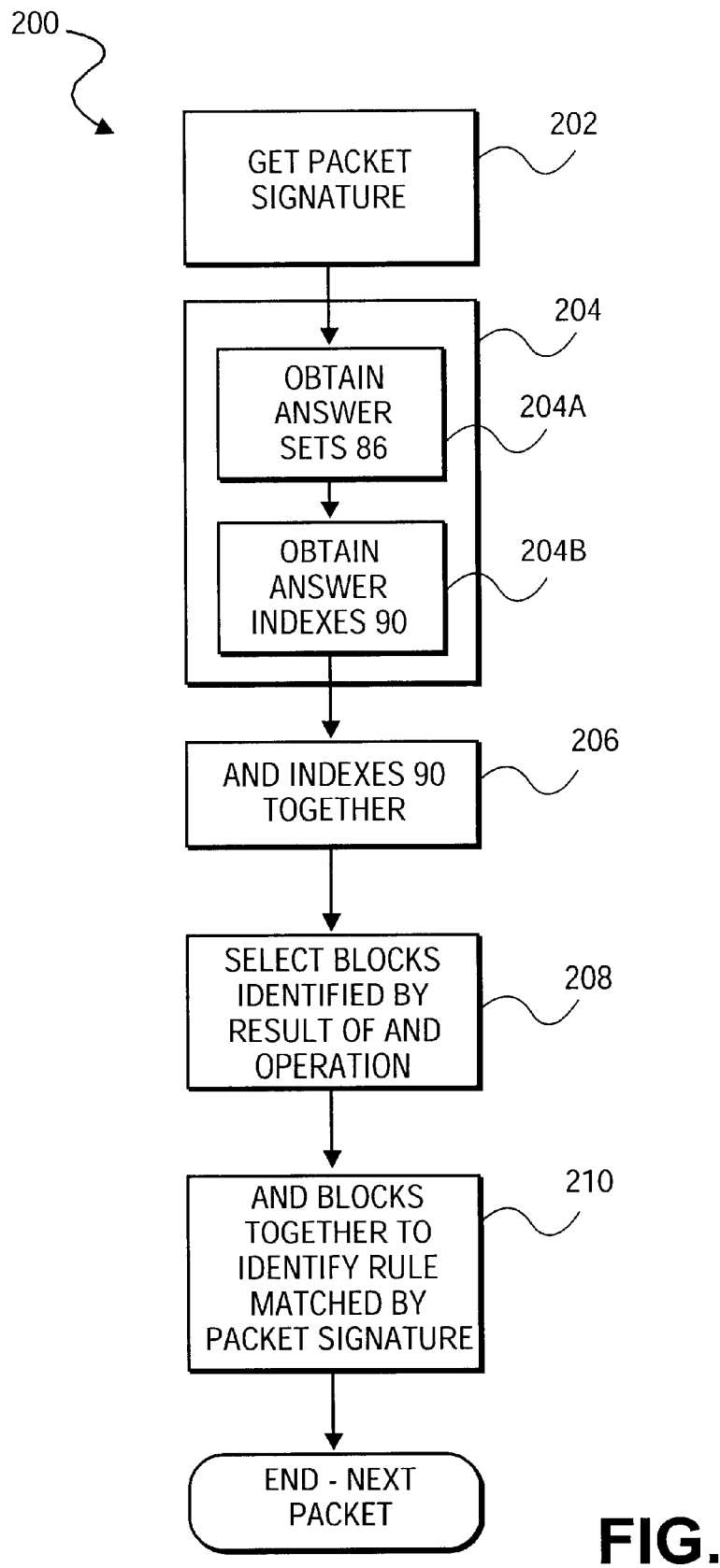
FIG. 6 is a flow chart illustrating a sequence of events according to the invention.

As shown in FIG. 6, the method 200 of this embodiment of the invention begins by getting the signature from a packet (step 202) and generating an answer set 86 comprising a first set of flags 83 (step 204). Answer sets 86 are divided into subsets of flags 83 (logical blocks 88). Within each logical block 88 if any flag 83 is set to TRUE then the method sets a flag corresponding to that logical block in an answer index (second group of flags in header 90) (step 204B). The method then identifies those blocks 88 which might include rules which match the packet signature 84. This is done by performing an AND operation (step 206) in a suitable AND processor on the answer indexes (headers 90) corresponding to all of the answer sets 86.

The method selects blocks which correspond to bits in the answer index which are TRUE for all of the answer indexes (step 208). In the example of FIG. 5, the result of the AND operation of step 206 is the vector "1001" which indicates that only blocks 88A or 88D could contain matched rules. The result of this AND operation indicates that there is no point in further considering blocks 88B or 88C of vectors 86 since no rule in blocks 88B or 88C can be matched. The method continues in step 210 by performing an AND operation on the blocks selected in step 208 for all answer sets. The center two blocks of vector 89 are blank to illustrate that no AND operation is done on the corresponding blocks of answer sets 86. If such an AND operation were performed then the result would be strings of zeroes in each of the center two blocks of vector 89. The result vector 89 identifies the rule which is satisfied by the signature of the packet in question as the rule corresponding to the fifth bit from the right in block 88A of result vector 89. FIG. 5 is a contrived example. In most commercial applications the methods of the invention will avoid the need to perform hundreds or thousands of AND operations in classifying each packet.

Figure 7:
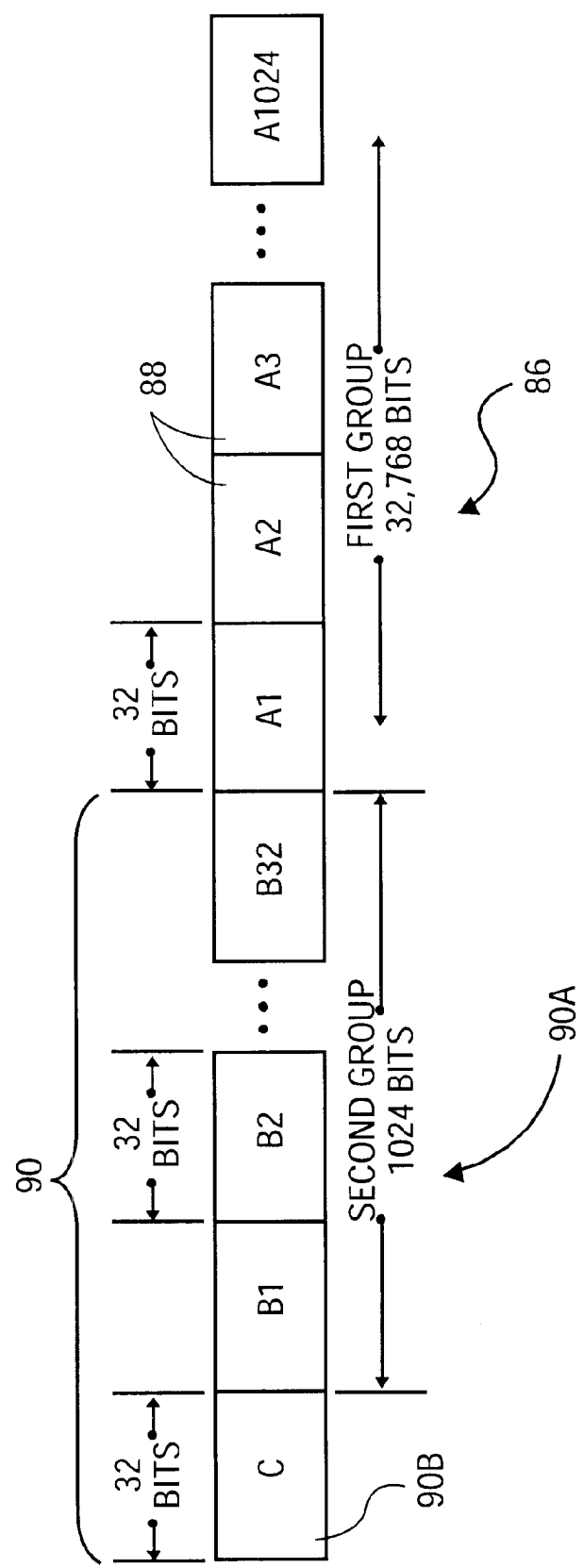
FIG. 7 illustrates the structure of an answer set comprising an output vector with an answer index comprising a two tiered header.

In cases where there are a very large number of rules, the answer index may have several tiers. For example, the answer index itself be divided into blocks or other subsets of the second group of flags. A third group of flags may be provided to identify the block(s) in the second group of flags which contain at least one bit set to TRUE. FIG. 7 illustrates an answer set 86 containing 32 k bits. Such an answer set may support up to 32 k rules. Answer set 86 is represented as a vector which is divided into 1024 logical blocks 88 which are labeled A1 through A1024 in FIG. 7. Each block 88 contains 32 bits. In this case the answer index is a header 90 which has a two tiered structure. A second group 90A of bits has one bit corresponding to each block 88 of answer set 86 (in the example, second group 90A has 1024 bits). Second group 90A is logically divided into 32 blocks, each of 32 bits. The blocks of second group 90A are labeled B1 through B32. Header 90 also comprises a third group 90B of 32 bits. Group 90B has one bit corresponding to each block of second group 90A. A bit in group 90B is set to true if any bits in the corresponding block of group 90A is set to TRUE.

When two tiered headers of the sort shown in FIG. 7 are used, an AND operation is performed on the flags in third group 90B of each output answer set 86 (if there is an answer index for more than one parameter). The result of this operation is a bit vector in which each bit is set to TRUE if and only if at least one bit is set to TRUE in the corresponding block of second group 90A for each of the answer sets 86 corresponding to each parameter in the signature of the packet being classified. Next, AND operations are performed only on those blocks within second group 90A for which the corresponding bit in third group 90B is set to TRUE. Finally, AND operations are performed on the answer sets 86 on those blocks 88 of answer sets 86 for which a corresponding bit in second group 90A for all output vectors is set to TRUE. In cases where there is an extremely large number of rules, header 90 could comprise three or more tiers.

When the first group of flags is sparse for at least one parameter (e.g. when most of the bits of the answer set 86 for at least one parameter value are set to FALSE) the method permits classifying a packet according to a very large number of rules with only a few AND operations. This dramatically reduces the time taken to determine the classification of a packet by performing an AND operation on answer sets 86.

The operation of the invention may be optimized by selecting an ordering for the rules so that, for at least one parameter in a packet's signature, those rules which are satisfied simultaneously all tend to be represented by bits in the same block or blocks 88 of at least one answer set 86. Grouping bits which are set together in the same blocks 88 tends to yield a sparser answer index. The number of AND operations required to compute output vector 89 is reduced if the answer index is sparser. It is generally convenient to perform this optimization on the dimension of either the source IP address (src) or the destination IP address (dst).

One procedure for optimizing the ordering of rules in the src dimension involves grouping "neighbourhoods" of rules together. If R is the set of classification rules and r is a particular rule in R then one can define src(r) as being the condition imposed on a packet's src value by rule r. For example, if r is the following two-dimensional rule:

Class A: src=123.120.0.0/16 dst=189.78.0.0/16 where/16 indicates that the src value of a packet must match the network ID portion which makes up the first 16 bits of the IP address 123.120.0.0 or the packet cannot satisfy r, then src(r)=123.120.0.0/16. In some rules the src value does not matter. For such rules one can write src(r)=*.

If r1 and r2 are two rules in R then r1 and r2 are neighbors if either src(r1) is a prefix of src(r2) or src(r2) is a prefix of src(r1). The relationship between two neighboring rules can be indicated as r1~r2. For example, the following rules are neighbors in the src dimension:

r1: Class A: src=123.120.0.0/16; dst=189.78.0.0/16
r2: Class B: src=123.120.9.0/24; dst=120.78.0.0/16.

A neighborhood in the src dimension is a subset S of R such that r1~r2 for any two rules r1 and r2 in S. The neighborhood is an "entire" neighborhood if no rule r in S is neighbors in the src dimension with any rule in R-S (R-S is the set of all rules in R which are not in S).

One way to optimize the ordering of rules in the src dimension is to break R into a number of subsets, the rules in each subset being a neighborhood, and to assign rules to the bit positions in answer sets 86 such that each neighborhood is contained in the smallest possible number of blocks 88. One way to accomplish this is to begin assigning rules to the bit positions in answer sets 86 such that each neighborhood begins on a boundary of one of blocks 88. Each neighborhood may occupy less than one block more than one block or exactly one block. Preferably the optimization involves breaking R into a number of subsets so that the rules in each subset form an entire neighborhood. If this is done then the first rule in each subset may be assigned to the first bit in a block 88 in a vector representing an answer set 86. More preferably the optimization involves ordering the rules within each subset in an order such that: if src(r1) is a prefix of src (r2) then r1 is ordered behind r2. Subsets of R which contain only one or only a few rules may be used to fill up unfilled blocks 88.

It is possible for two or more neighbourhoods to share members. Two neighbourhoods which share members may be called "friendly" neighbourhoods. It is preferable to avoid having the same rule represented by two flags in an answer set 86. Therefore, it is preferable to eliminate duplication of rules between friendly neighbourhoods. If S1 and S2 are friendly neighbourhoods then one could remove the common rules from either S1 or S2 while retaining the common rules in the other one of S1 or S2. In general it is desirable to keep the maximum size of neighborhoods smaller than a block 88 so that all neighbourhoods can fit within one block. Therefore, the optimization preferably involves removing common members from whichever one of each pair of friendly neighbourhoods has the largest number of members. This is done before rules are placed in order.

A simple ordering is to simply assign rules r to the flags 83 of result sets 86 by assigning the rules of the first (largest) subset of R to bit positions beginning at the start of the first block A1 in vector 86; assigning the rules of the second (second largest) subset to bit positions beginning at the next bit after the last rule of the first subset; and so on. Other ordering schemes could also be used and come within the broad scope of the invention.

An ordering which may be advantageous in some situations involves dividing R into a number of subset neighbourhoods, ordering the subsets in decreasing order of the number of rules in each subset and then assigning the rules to the bit positions in result set 86 such that each subset begins at a boundary of one of blocks 88 and subsequent rules in the subset are assigned to subsequent bit positions in the same block 88. For example, the subsets may be assigned to blocks by assigning the rules of the first (largest) subset to bit positions beginning at the start of the first block A1 in vector 86; assigning the rules of the second (second largest) subset to bit positions beginning at the start of the next free block 88 in vector 86; and so on. When none of the blocks are empty then any remaining subsets may be fitted into the empty portions of those blocks 88 which are not full.

While the above optimization has been described for the src dimension the optimization could be performed on the dst dimension in substantially the same manner described above. The optimization can be done on only one of the src or dst dimensions.

As noted above, the rules should be consistent in the sense that they should not include any conflicts. It can be difficult to identify classification conflicts from the answer sets used in this invention. Class conflicts may be identified more readily by constructing a data structure in which conflicting rules become readily apparent.

Figure 8:
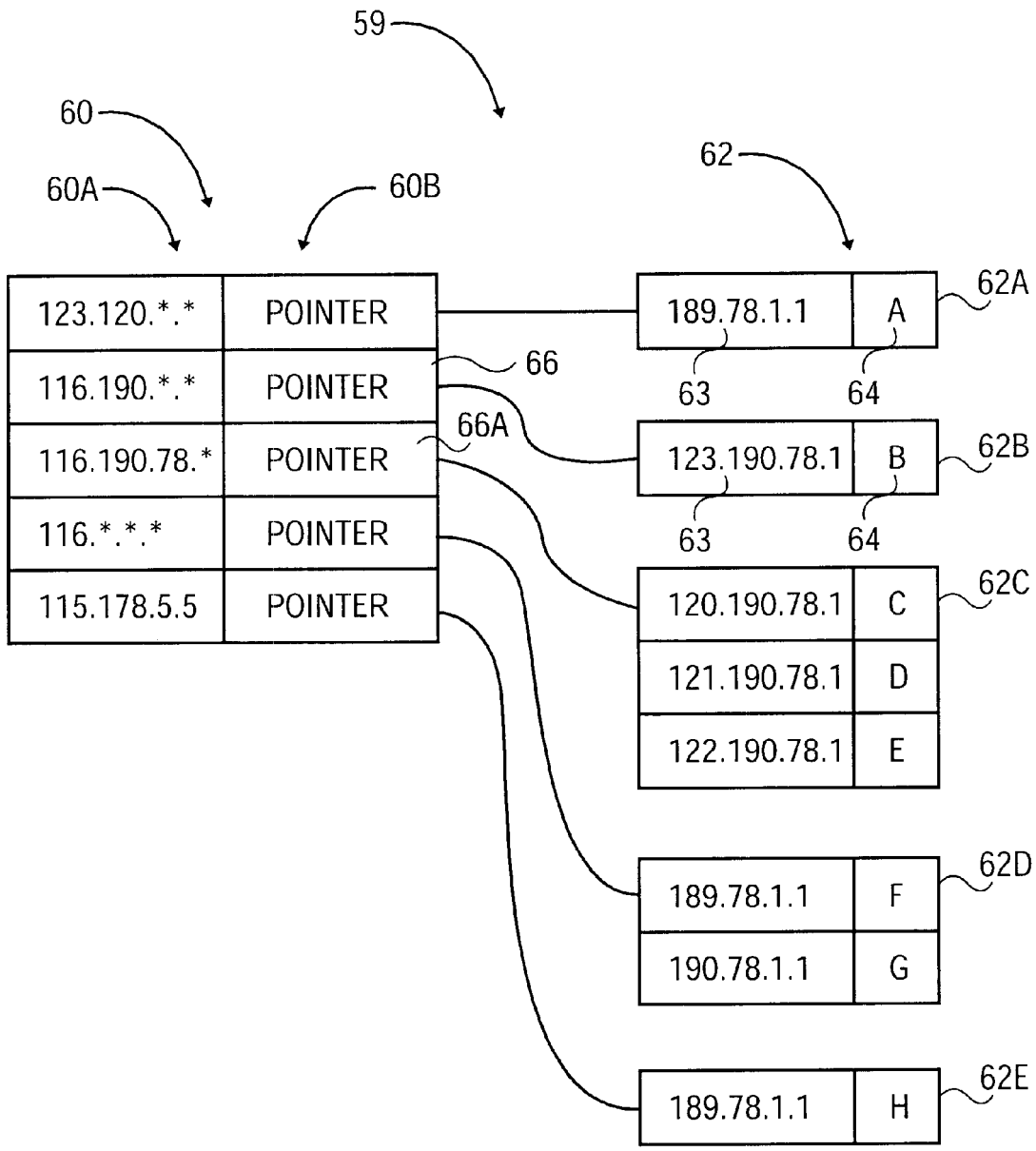
FIG. 8 is a schematic diagram which illustrates a data structure for use in verifying a rule base.

FIG. 8 illustrates a data structure 59 which may be provided in a memory within ESP 24 for the practice of this embodiment of the invention. Data structure 59 corresponds to a 2-dimensional classification scheme which includes the 8 rules listed in Table I. Data structure 59 has N levels of tables (N=2 in the example of FIG. 8). One level of tables corresponds to each parameter value in the signature of a packet. A first level table 60 corresponds to the first parameter value. One or more second level tables 62 correspond to the second parameter value, and so on.

TABLE I

Example Rules

| Class A: | src=123.120.*.*; dst=189.78.1.1 |
| Class B: | src=116.190.*.*; dst=123.190.78.1 |
| Class C: | src=116.190.78.*; dst=120.190.78.1 |
| Class D: | src=116.190.78.*; dst=121.190.78.1 |
| Class E: | src=116.190.78.*; dst=122.190.78.1 |
| Class F: | src=116.*.*.*.; dst=189.78.1.1 |
| Class G: | src=116.*.*.*.; dst=190.78.1.1 |
| Class H: | src=115.178.5.5; dst=189.78.1.1 |

Each row of first table 60 includes a distinct condition 60A for the first dimension, src and a pointer 60B to one of five second level tables 62. Each row of each second level table 62 includes a condition 63 to be matched by the second dimension, dst, and a value 64 indicating the class in which the packet is classified when the corresponding condition is satisfied. There will typically be a great many rules.

The tables of data structure 59 are created from the rules by identifying all of the distinct conditions for a first parameter value in a packet signature and creating an entry in the first table which corresponds to each distinct condition. Two or more different rules may specify the same distinct condition for the first parameter. The first table only needs one entry for each distinct condition on the first parameter. One second level table is created corresponding to each of the distinct conditions in the first level table. A pointer to each second level table is written in the corresponding entry of the first level table. Each entry includes a pointer to a second level table. Each entry corresponds to a group of one or more rules which include the condition for that entry.

In each second level table an entry is created for each distinct condition for a second parameter which is specified by any of the rules in the group of rules associated with the entry in the first level table which points to that second level table. If the classification rules in Table I had more than 2 dimensions then second level tables 62 would include pointers to third level tables.

The process is repeated for subsequent level tables. Each subsequent level table includes conditions for a subsequent parameter. The conditions are taken from those rules which have entries in the next lower numbered level tables which point to the subsequent level table being constructed. An entry is created in the table being constructed for each distinct condition imposed by those rules on the value of the parameter which corresponds to the table. The number of distinct conditions will be equal to or less than the number of rules. In general, several rules may specify the same distinct condition on the parameter corresponding to the table being constructed. For example, several rules which use a second level or subsequent level table may all impose a wild card condition on the parameter value which corresponds to the table.

After data structure 59 has been created, or during the creation of data structure 59, the method expands data structure 59 by adding entries to one or more of the tables in data structure 59.

Figure 9:
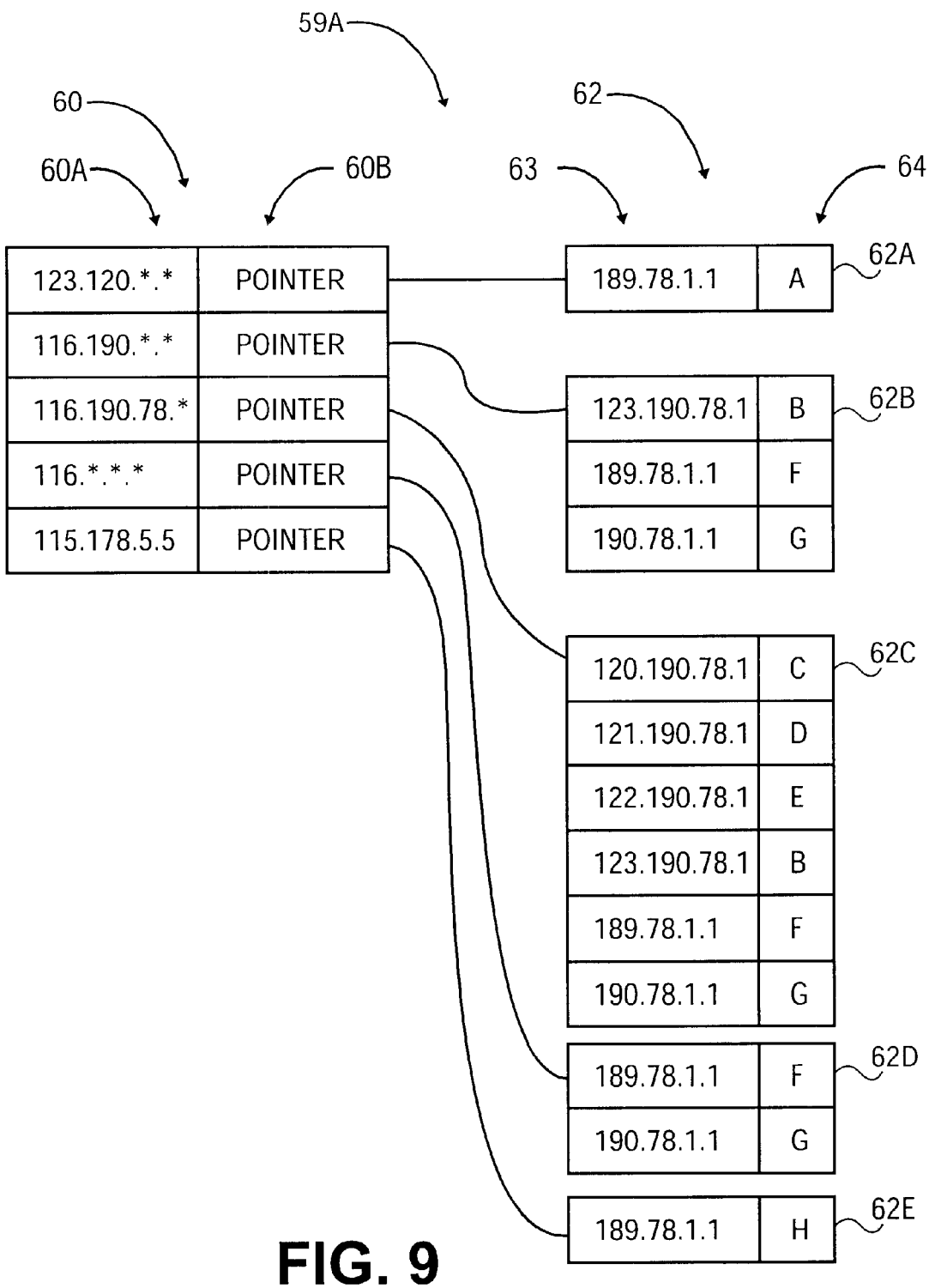
FIGS. 9 and 9A are schematic diagrams which illustrate expanded data structures for use in verifying a rule base.

In the two dimensional case illustrated by the above examples, the improved method involves adding entries to certain ones of tables 62A through 62E in data structure 59A as shown in FIG. 9. In each case where a parameter value could simultaneously match two or more of the distinct conditions 60A of table 60 there must be some criterion for selecting which one of the conditions takes precedence over the other so that classifications will be unique. The expansion involves duplicating entries of the second level table 62 which correspond to the condition of lower precedence in the table 62 which corresponds to the condition having higher precedence. For example, in the case of longest prefix matching, if table 60 includes a first condition which is a prefix of a second condition, then the entries of the second level table corresponding to the first (lower precedence) condition are duplicated in the second level table corresponding to the second (higher precedence) condition. This is equivalent to adding new rules to the rule base as shown in Table II.

TABLE II

Expanded Rule Set

| Class A: | src=123.120.*.*; dst=189.78.1.1 |
| Class B: | src=116.190.78.*; dst=123.190.78.1 |
| Class B: | src=116.190.*.*; dst=123.190.78.1 |

TABLE II-continued

Expanded Rule Set

| | |
|---|---|
| Class C: | src=116.190.78.*; dst=120.190.78.1 |
| Class D: | src=116.190.78.*; dst=121.190.78.1 |
| Class E: | src=116.190.78.*; dst=122.190.78.1 |
| Class F: | src=116.190.78.*; dst=189.78.1.1 |
| Class F: | src=116.190.*.*; dst=189.78.1.1 |
| Class F: | src=116.*.*.*; dst=189.78.1.1 |
| Class G: | src=116.190.78.*; dst=190.78.1.1 |
| Class G: | src=116.190.*.*; dst=190.78.1.1 |
| Class G: | src=116.*.*.*; dst=190.78.1.1 |
| Class H: | src=115.178.5.5; dst=189.78.1.1 |

If the rules include additional dimensions for which "best" matching is performed then the rule base for the additional dimensions is preferably also expanded as set out above. "Best" matching occurs most often in the context of longest prefix matching which is typically performed only on IP addresses, such as src and dst. Best matching may also be used in cases where one rule specifies a wildcard, a set of parameter values, or a range of parameter values to match a parameter and another rule specifies a particular value to match the same parameter. A match to a single value is a "better match" than a match to one of a set of values. A match to one of a set of values is a better match than a match to a range of values. A match to a range of values is a better match than a match to a wildcard.

Figure 9A:
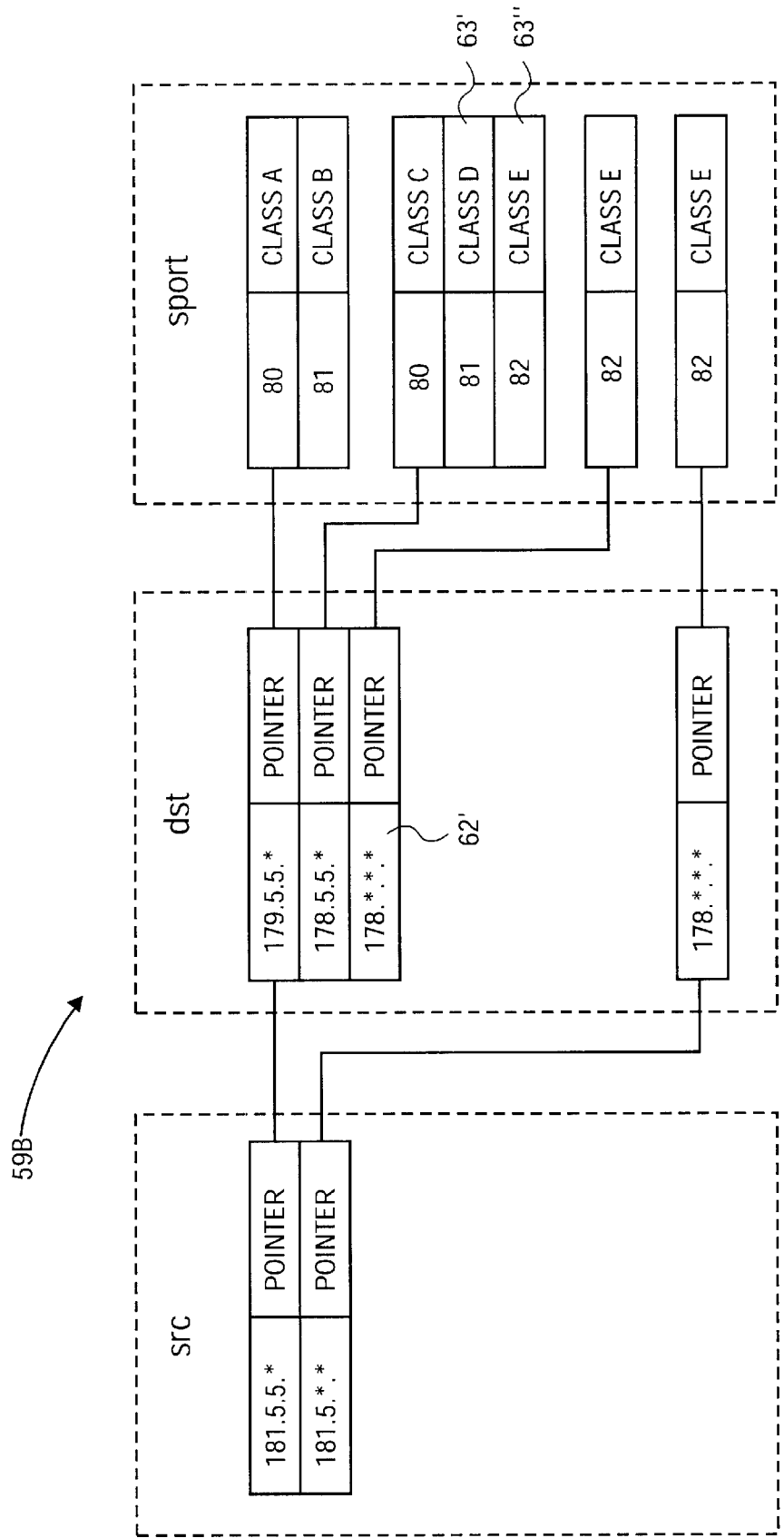

For example, the following set of rules may be expanded in both the src and dst dimensions to yield a data structure 59B as shown in FIG. 9A:

TABLE III

| | |
|---|---|
| Class A: | src=181.5.5.*; dst=179.5.5.*; sport=80 |
| Class B: | src=181.5.5.*; dst=179.5.5.*; sport=81 |
| Class C: | src=181.5.5.*; dst=178.5.5.*; sport=80 |
| Class D: | src=181.5.5.*; dst=178.5.5.*; sport=81 |
| Class E: | src=181.5.*.*; dst=178.*.*.*; sport=82. |

It can be seen in the example of FIG. 9A that in addition to entries corresponding directly to the rules of Table III an entry 62' has been added to a second level table (for the dst dimension) and entries 63' and 63" have been added to third level tables (in the "sport" dimension).

Constructing tables corresponding to expanded rule sets such as those in Table II and Table III provides data structures 59A and 59B which can be used to verify that there are no conflicts in the rule base. If any pointer should point to two different class identifiers then there must be a conflict in the rule base.

A computer processor can construct a data structure corresponding to the rules in a rule base, as described above, and can determine whether any pointer should point to two different class identifiers. If so, the processor can signal the existence of a conflict in the rule base and can identify the rules which create the conflict.

Obtaining Answer Sets

In general, the invention may be practiced by obtaining answer sets in any manner. The inventors have developed a search algorithm which is particularly good for searching for answer sets corresponding to IP addresses. The naive way to do this would be to simply use the IP addresses as indexes into a data structure which includes pointers to answer sets. As is known, every IP address is 32 bits in length, and thus there are a maximum of $2^{32}$ distinct IP addresses, all of which can be represented by a binary tree with a depth of 32. Since there are $2^{32}$ possible IP addresses a memory large enough to accommodate $2^{32}$ pointers would be needed to implement this direct approach.

Instead, the preferred algorithm breaks the IP address into a number of levels. Currently 3 levels are preferred. This reduces memory requirements because there are typically only a few IP address prefixes of interest in a rule base. In the preferred embodiment, all IP address prefixes up to 16 bits in length are stored in a table which makes up the root level of a tree. The root-level of the tree is indexed by a number from 0 to 65535, which is manageable.

A set of tables which make up the second level of the tree is provided for indexing IP addresses from the $17^{th}$ to $24^{th}$ bits. The tables in the second level of the tree are each pointed to by an entry in the root level table. While there could theoretically be as many as 65,536 second level tables, in practice this number can be greatly reduced. One does not need to reproduce any second level tables which could never be needed to locate an answer set. A table in the second level of the tree is indexed by a number between 0 and 255.

A set of tables which make up the third level of the tree, is provided for matching the $25^{th}$ to $32^{nd}$ bits of IP addresses. A table in the third level of the tree is indexed by a number between 0 and 255. While there could theoretically be as many as 256 third level tables for every first level table entry, in practice this number can also be greatly reduced.

Given an IP address, say b1.b2.b3.b4, where b1, b2, b3 and b4 are each a binary value in the range of 0 to 255, one can take "b1.b2" as a value and use it as an index to retrieve an entry from the first level of the tree. The entry indicates one of three possibilities as follows: 1) no IP address which begins with "b1.b2" can match any rules, therefore the packet must belong to a default class; 2) there is an answer set corresponding to "b1.b2" or 3) "b1.b2" is part of a longer IP address prefix.

A second level table only needs to be provided for entries which correspond to the third case above. In the third case it is necessary to continue to search in a table in the second level of the tree which is pointed to by the entry corresponding to "b1.b2" in the root level of the tree.

"b3" may be used as an index to retrieve an entry from the second level of the tree. Once again, the entry can indicate one of three possible situations, as follows: 1) no IP address which begins with "b1.b2.b3" can match any rules, therefore the packet must belong to a default class; 2) there is an answer set corresponding to "b1.b2.b3" or 3) "b1.b2.b3" is part of a longer IP address prefix, and in this case it is necessary to continue to search in the table of the third level of the tree which is pointed to by the entry identified by the index "b3" in the searched table of the second level of the tree.

It is only necessary to provide third level tables corresponding to those entries in second level tables for which the third situation exists. In the third case, "b4" may be used as an index to retrieve an entry from the table identified in the third level of the tree. The entry will indicate one of only two possibilities: 1) the IP address "b1.b2.b3.b4" does not match any rules, therefore the packet must belong to a default class; or 2) there is an answer set corresponding to "b1.b2.b3.b4". It can be seen that the search algorithm requires only three memory accesses to obtain pointer to a desired answer set (or an indication that the packet being classified must belong to a default class).

EXAMPLE

Suppose that we wish to provide a three-level tree, as described above to locate answer sets for a rule base having the following rules:

1. Class B: src=120.3.0.0/16; dest=150.23.67.0/24; dport=80; sport=*
2. Class A: src=120.0.0.0/8; dest=135.89.0.0/16; dport=*; sport=80
3. Class E: src=197.123.10.60/28; dest=*; dport=120; sport=*
4. Class D: src=197.123.10.0/24; dest=*; dport=100; sport=*
5. Class C: src=197.123.12.0/20; dest=*; dport=100; sport=*

In order to find source addresses of interest with respect to the above five rules, all rules in which a source address prefix has a length of less than 16 are expanded to an equivalent set of source address prefixes with the length 16. In this example, only rule 2 has a source address prefix of less than 16. The following set of 256 rules is equivalent to Rule 2:

Class A: src=120.0.0.0/16, dest=135.89.0.0/16, dport=*; sport=80
Class A: src=120.1.0.0/16, dest=135.89.0.0/16, dport=*; sport=80
Class A: src=120.2.0.0/16, dest=135.89.0.0/16, dport=*; sport=80
Class A: src=120.3.0.0/16, dest=135.89.0.0/16, dport=*; sport=80
. . .
Class A: src=120.253.0.0/16, dest=135.89.0.0/16, dport=*; sport=80
Class A: src=120.254.0.0/16, dest=135.89.0.0/16, dport=*; sport=80
Class A: src=120.255.0.0/16, dest=135.89.0.0/16, dport=*; sport=80

Figure 10:
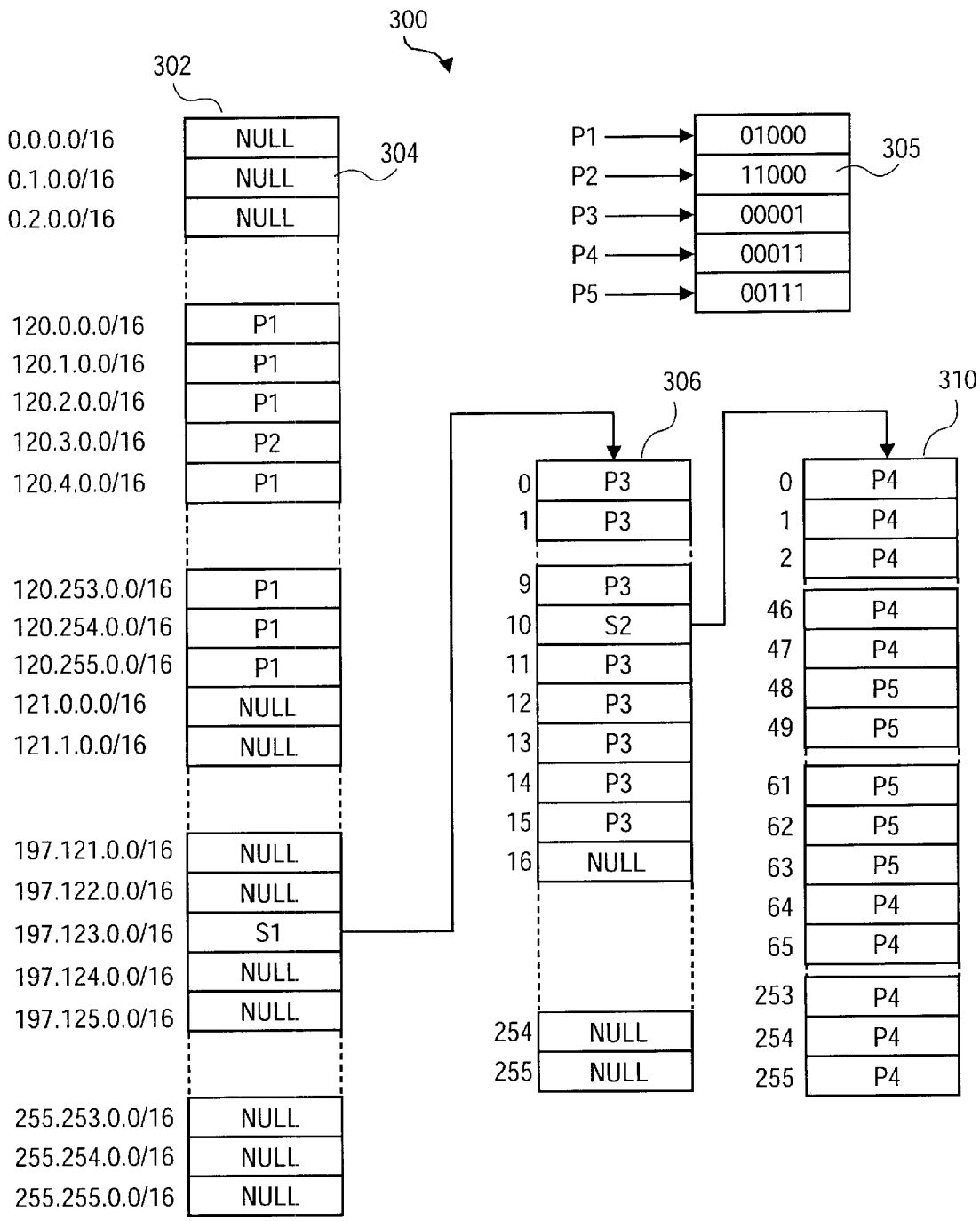
FIG. 10 illustrates a data structure useful for obtaining answer sets corresponding to IP address values; and, FIG. 11 illustrates a data structure useful for obtaining answer sets corresponding to range-valued parameters.

If one replaces rule 2 with the above 256 rules then it is apparent that only 257 source IP address prefixes are of interest at the first level. FIG. 10 illustrates a tree 300 which includes a first level (root level) table 302. Table 302 has 64K entries 304. Each entry 304 contains either a pointer to an answer set 305 (in which case the answer set may be retrieved using the pointer), a null pointer (in which case the packet must be classified in a default class) or a pointer to a second level table 306. If entry 304 contains a pointer then entry 304 should contain some indication of whether the pointer points to an answer set or to a second level table 306. If there is any rule for which the address in question does not matter (e.g., if there is any rule which includes the condition src=*) then there will be no null entries in any tables in tree 300.

In this example there is only one second level table 306. If the data packet being classified has a source IP address which begins with the prefix 197.123 then it is necessary to search in second level table 306 to locate the appropriate answer set. This is because the conditions for rules 3, 4 and 5 must be matched by more than 16 bits of a packet's source address.

The entries of second level table 306 may be determined by expanding all rules which set conditions which specify 17 to 24 bits of a source address. In this example, only Rule 5 needs to be expanded. The result is shown in FIG. 10. The 10th entry of table 306 points to a third level table. This is because both rules 3 and 4 set conditions on the source address which require the source address to begin with 197.123.10 plus some additional bits.

The $0^{th}$ through $9^{th}$ and $11^{th}$ through $15^{th}$ entries of table 306 point to an answer set containing only rule 5. The condition on src rule 5 can be rewritten in binary as: src=11000101.01111011.0000**.******. In particular, rule 5 indicates that the first 20 bits are relevant in a match "/20". Therefore, the first eight bits are 11000101 (197), and the second eight bits are 01111011 (123). The remaining four bits of the 20 relevant bits are the upper four bits of 00001100 (12), which are 0000. This condition is satisfied by the source addresses corresponding to any of the first 16 entries of table 306. The $17^{th}$ through $256^{th}$ entries of table 306 contain null pointers.

Third level table 310 is constructed in the same manner as second level table 306. Each of rules 3, 4 and 5 is expanded, as described above. In this example, the result of the expansion shows that source IP addresses having the first three bytes 197.123.10 and a fourth byte in the range of 48–63 satisfy the conditions on src imposed by all of rules 3, 4, and 5. The corresponding entries in table 310 therefore point to an answer set which contains rules 3, 4 and 5. Source IP addresses having the first three bytes 197.123.10 and a fourth byte in the range of 0–47 or 64–255 satisfy the conditions on src imposed by rules 4 and 5 only. Therefore, corresponding entries in table 310 point to an answer set containing only rules 4 and 5.

While it is convenient to partition IP addresses at depths of 16 and 24 bits, as described above, the invention could be practiced by partitioning addresses at different points. Ranges of IP address which do not line up with any bit boundaries may be handled in a similar way.

Other algorithms are best used for obtaining answer sets for range-matched parameters such as sport, dport, sport, tos. For example, consider the sport parameter which may have a value in the range of 0 to 64K. A rule may set a condition on the value of sport in one of several ways. The rule may specify that sport must have a specific value to satisfy the rule (e.g. sport=80), the rule may specify that sport must fall within a range of values to satisfy the rule (e.g. sport=80–100) or the rule may specify that sport must have a value which coincides with one of several discrete values and/or ranges (e.g. sport=(80, 100–120, 150–170)).

As there is a total of 64K different possible values for sport one can use a 64K-entry array to store pointers to answer sets. An answer set will typically be simultaneously pointed by many entries in the 64K array. While one could provide multiple instances of the same answer set it is preferable to provide only one instance of each answer set in order to conserve memory.

Figure 11:
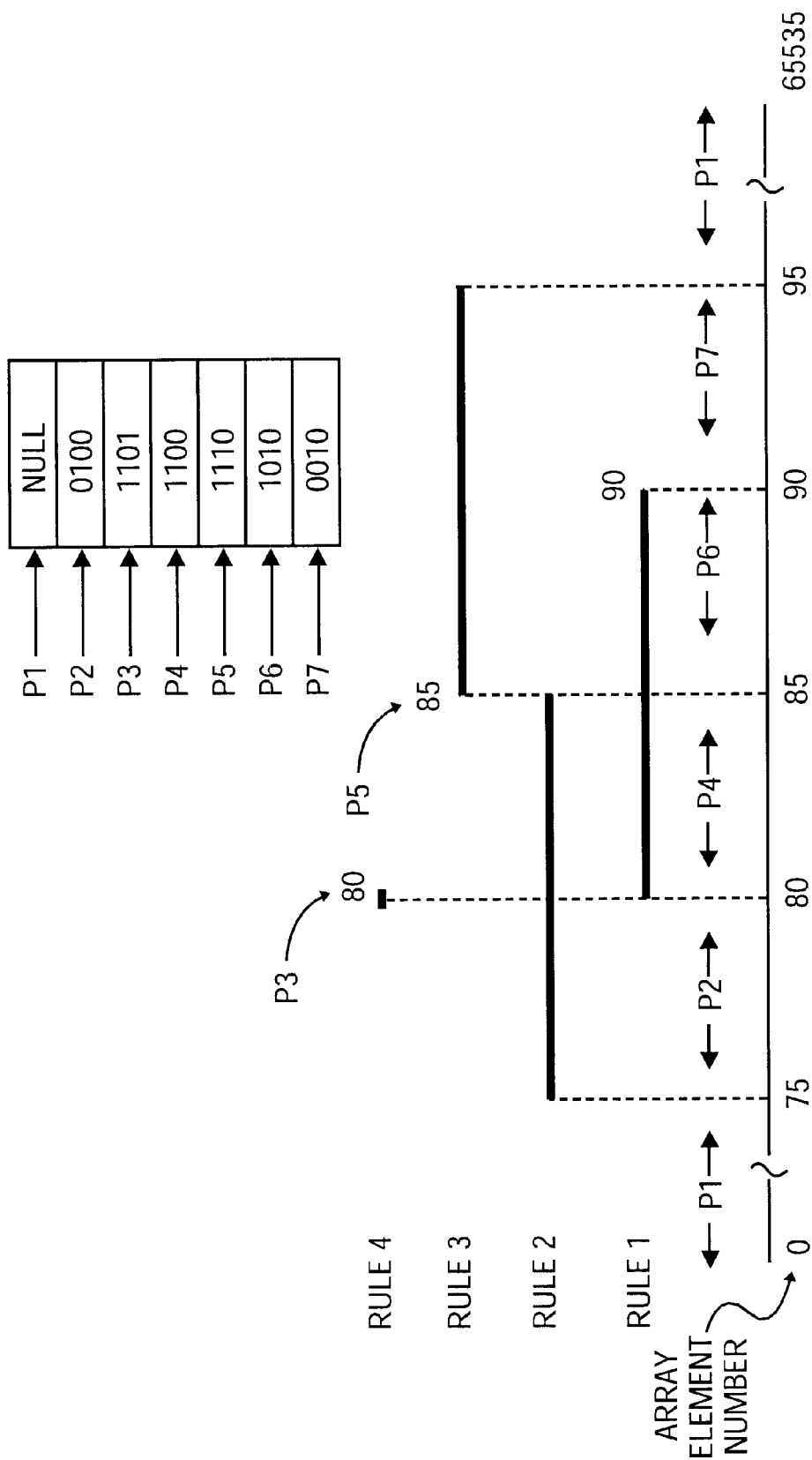

As shown in FIG. 11, it is possible to identify ranges of values for sport which will share the same answer set. For example, consider a rule base which includes rules which set the following conditions on sport as illustrated in FIG. 11:

Rule 1: Class A: sport=80–90
Rule 2: Class B: sport=75–85
Rule 3: Class C: sport=85–95
Rule 4: Class D: sport=80.

One can identify ranges of values for sport which satisfy the same combinations of rules. As shown in FIG. 11, for this example, there are 6 different answer sets (not counting the NULL answer set). The entries in the 64K array can include pointers to the appropriate answer set as indicated in FIG. 11. This data structure will allow an answer set to be obtained with a single memory access.

It can be appreciated that a rule which specifies a match to a set of values can be dealt with in substantially the same manner as described above, with respect to FIG. 11. For example, if Rule 4 had specified a set of two values, e.g. sport=80 or 98 then there would be an additional answer set P8 applicable only when sport=98. In answer set P8 only Rule 4 is satisfied.

Once a packet has been classified then the classification information can be forwarded to a scheduler for use in scheduling the transmission of the packet. Scheduling may be performed, for example, in the manner described in the above-noted provisional patent application, which is incorporated herein by reference, or by any other scheduling apparatus which can schedule the dispatch of packets according to a packet classification.

As will be apparent to those skilled in the art in the light of the foregoing disclosure, many alterations and modifications are possible in the practice of this invention without departing from the spirit or scope thereof.

For example, while the invention has been described primarily with reference to IP packets, the invention could also be practiced with packets formatted for other network protocols. The invention may be practiced in any context where it is necessary to perform multi-dimensional classification of packets. The classification parameters do not need to correspond to values which can be extracted from IP packet headers. The invention may even be used to support multiple protocols concurrently. In this case the value for the layer 3 packet type may be used to identify the protocol for each incoming packet. For each protocol a different set of parameter values will make up the signature of a packet. A signature is generated for each packet by reading the values of that protocol-specific set of parameters. Packets in each protocol can then be classified using the methods of the invention, as set out above.

While the foregoing specification has described classification as being done at a demarcation unit, the classification methods and apparatus of the invention have application at any place in a network where it is necessary to classify data packets.

Embodiments of the invention may be implemented through the use of programmed general purpose computer processors or through the use of special hardware.

While the answer sets 86 of the invention have been represented in the examples as "vectors", the answer sets 86 may be any ordered group of flags capable of being set to indicate the applicability of individual rules in a rule base. It is not mandatory for the flags which make up an answer set 86 to be stored in sequential locations in a memory, for example. Similarly, when the second set of flags 90 which makes up an answer index is kept together with a bit vector 86, it is not necessary that second flags 90 be at any particular location in a storage device relative to bit vector 86. For example, the combination of an answer set 86 and its answer index 90 may be represented as a tree in which the first level header is the root of the tree, second level headers are non-leaf nodes of the tree and each block 88 of answer set 86 is a leaf node of the tree. This representation of an answer set can be used to optimize the use of memory because blocks 88 which consist entirely of zeroes (flags set to FALSE) may be omitted, thereby conserving memory.

In some cases, a particular parameter value will correspond to a null answer set. That is, none of the rules can be satisfied for any packet having that particular parameter value. Step 204 may include automatically assigning a packet being classified to a default class if any answer set for that packet is a null answer set.

Preferred implementations of the invention may include a computer system programmed to execute a method of the invention. The invention may also be provided in the form of a program product. The program product may comprise any medium which carries a set of computer-readable signals corresponding to instructions which, when run on a computer, cause the computer to execute a method of the invention. The program product may be distributed in any of a wide variety of forms. The program product may comprise, for example, physical media such as floppy diskettes, CD ROMs, DVDs, hard disk drives, flash RAM or the like or transmission-type media such as digital or analog communication links.

Accordingly, the scope of the invention is to be construed in accordance with the substance defined by the following claims.

What is claimed is:

1. A method for classifying data packets, the method comprising:
   (a) providing a plurality of classification rules, each rule providing matching criteria for one or more parameters;
   (b) obtaining a signature comprising a plurality of parameter values for a data packet;
   (c) for each of a plurality of the parameter values obtaining an answer set comprising a first group of flags, one of the first group of flags in each answer set corresponding to each of the rules, each answer set divided into a plurality of blocks;
   (d) for each of one or more answer sets, obtaining an answer index comprising a second group of flags, one of the second group of flags corresponding to each block in the corresponding answer set, each flag of the second group of flags set to TRUE if any flag in the corresponding block is TRUE; and,
   (e) performing a logical AND operation on corresponding answer indexes to identify second flags which are set to TRUE in all of the answer indexes; and,
   (f) performing a logical AND operation on those blocks from all of the answer sets for which the corresponding second flags are set to TRUE in all of the answer indexes.

2. The method of claim 1 wherein obtaining an answer set for a parameter value comprises looking up the parameter value in a table.

3. The method of claim 1 wherein, for at least one parameter value, obtaining an answer set comprises, selecting a first part of the parameter value, using the first part of the parameter value as an index to an entry in a first table; determining whether the entry in the first table is a pointer to a second table and, if so, using a second part of the parameter value as an index to an entry in the second table.

4. The method of claim 3 wherein the at least one parameter value is an IP address.

5. The method of claim 4 wherein the first part of the parameter value comprises 16 highest order bits of the IP address and the second part of the parameter value comprises lower order bits of the IP address.

6. The method of claim 3 comprising determining whether the entry in the second table is a pointer to a third table and, if so, using a third part of the parameter value as an index to an entry in the third table.

7. The method of claim 6 wherein the at least one parameter value is an IP address, the first part of the parameter value comprises 16 highest order bits of the IP address, the second part of the parameter value comprises four lower order bits of the IP address and the third part of the parameter value comprises four lowest order bits of the IP address.

8. The method of claim 2 wherein looking up the parameter value in a table yields a pointer to a memory location containing the answer set.

9. The method of claim 1 wherein the second group of flags in the answer index comprises a plurality of subsets of the second group of flags and the answer index comprises a third group of flags, the third group of flags comprising one flag corresponding to each subset in the second group of flags, each flag of the third group of flags set to TRUE if any flag in the corresponding subset of the second group of flags is TRUE.

10. The method of claim 9 comprising
   a) selecting one or more subsets of the second group of flags for which corresponding flags in the third group of flags in each answer index are TRUE;

b) selecting blocks in the answer sets for which corresponding flags in the selected subset of the second group of flags in each answer index are TRUE;

c) and performing a logical AND operation on the selected blocks of the answer sets.

11. The method of claim 1 wherein each answer index comprises a top level group of flags and one or more intermediate level groups of flags each comprising a plurality of subsets, each subset corresponding to a flag in a higher level group of flags and, each flag in the top level group corresponding to a subset in a highest level one of the intermediate level groups, the method comprising identifying one or more subsets of a lowest level one of the intermediate groups of flags, the subset including at least one TRUE flag in each answer index by:

a) performing a logical AND operation on the top level groups of flags of the answer indexes to identify those corresponding subsets of a lower level group of flags which include at least one TRUE flag in each answer index;

b) iteratively repeating step (a) on the identified corresponding identified subsets until receiving a result which identifies second flags which are set to TRUE in all of the answer indexes.

12. The method of claim 1 wherein the signature comprises two or more parameter values selected from the group consisting of:

input port on which the packet arrived; source address; destination address; source UDP or TCP port number; destination UDP or TCP port number; Type of Service ("TOS") value; layer 4 packet type; ack flag; and, time of packet arrival.

13. The method of claim 1 wherein the blocks are equal in size.

14. The method of claim 13 wherein the AND operations are performed in a processor having a register size and each of the blocks has a size equal to the register size of the processor.

15. The method of claim 1 wherein, for one of the parameters, the rules are grouped so that flags corresponding to subsets of the rules which are neighbors are grouped together in groups of rules.

16. The method of claim 15 comprising ordering the rules within the groups such that if a first rule sets a condition on the parameter which is a prefix of the condition set by a second rule the first rule is ordered behind the second rule.

17. The method of claim 15 wherein rules in each group are assigned to flags which are in the same block.

18. The method of claim 17 comprising ordering the rules by selecting subsets of the rules so that each subset contains only neighboring rules, if any rules are present in both of any two of the subsets of neighboring rules removing those rules which are common to the two subsets from a larger one of the two subsets, and assigning each subset of rules to adjacent flags in one of the blocks.

19. The method of claim 1 wherein the matching criteria include range matching conditions.

20. The method of claim 1 wherein the matching criteria include set matching conditions.

21. A method for classifying data packets, the method comprising:

(a) providing a plurality of classification rules, each rule providing matching criteria for one or more parameters;

(b) a step for obtaining a signature comprising a plurality of parameter values for a data packet;

(c) for each of a plurality of the parameter values, a step for setting a first group of flags, one of the first group of flags corresponding to each of the rules, each flag set to TRUE if the parameter value matches the matching criteria for the rule corresponding to the flag, each flag set to FALSE otherwise, each first group of flags divided into a plurality of blocks;

(d) for each of the first groups of flags, a step for setting a second group of flags, one of the second group of flags corresponding to each block in the corresponding first group of flags, each flag of the second group of flags set to TRUE if any flag in the corresponding block of the first group of flags is set to TRUE, each flag of the second group of flags set to FALSE otherwise; and, (e) performing a logical AND operation on those blocks in the first groups of flags for which the corresponding flags are set to TRUE in all of the second groups of flags.

22. The method of claim 21 wherein the blocks are equal in size.

23. The method of claim 22 wherein the AND operations are performed in a processor having a register size and each of the blocks has a size equal to the register size of the processor.

24. The method of claim 21 wherein, for one of the parameters, the rules are grouped so that flags corresponding to subsets of the rules which are neighbors are grouped together.

25. The method of claim 24 wherein rules in each subset are assigned to flags which are in the same block.

26. The method of claim 25 comprising ordering the rules by selecting subsets of the rules so that each subset contains only neighboring rules, if any rules are present in both of any two of the subsets of neighboring rules removing those rules which are common to the two subsets from a larger one of the two subsets, and assigning each subset of rules to adjacent flags in one of the blocks.

27. The method of claim 21 wherein each of the first groups of flags comprises a bit vector and each flag comprises a bit.

28. Packet classification apparatus, the apparatus comprising:

(a) a computer accessible memory having a plurality of answer sets stored therein, each answer set comprising a plurality of first flags grouped into a plurality of blocks;

(b) an answer index in the memory, the answer index comprising a plurality of second flags with one second flag corresponding to each block, the second flag set TRUE if any first flag in the corresponding block is set TRUE; and, (c) a processor connected to receive a signature characterizing a data packet, the signature comprising a plurality of parameter values, the processor adapted to:

(i) identify an answer set corresponding to each parameter value in the signature;

(ii) retrieve from the memory and perform a first logical AND operation on answer indexes corresponding to the identified answer sets to yield a result; and, (iii) retrieve from the memory and perform a second logical AND operation on those blocks in the answer sets corresponding to TRUE bits in the result to identify a class to which the packet belongs.

29. The packet classification apparatus of claim 28 wherein the processor comprises a plurality of parallel processors, each parallel processor identifying the answer set corresponding to one of the parameter values in the signature.

* * * * *